(12) United States Patent
Stewart et al.

(10) Patent No.: US 7,724,154 B2
(45) Date of Patent: May 25, 2010

(54) SYSTEM AND METHOD FOR FOOD SERVICE STORAGE BIN MONITORING

(75) Inventors: Brett B. Stewart, Austin, TX (US); Dirk D. Heinen, Austin, TX (US)

(73) Assignee: Acumera, Inc., Austin, TX (US)

( * ) Notice: Subject to any disclaimer, the term of this patent is extended or adjusted under 35 U.S.C. 154(b) by 812 days.

(21) Appl. No.: 11/554,261

(22) Filed: Oct. 30, 2006

(65) Prior Publication Data

US 2008/0144697 A1    Jun. 19, 2008

(51) Int. Cl.
*G08C 19/12* (2006.01)

(52) U.S. Cl. .............. 340/870.17; 340/572.7; 340/539.27; 702/81

(58) Field of Classification Search .......... 340/572.7, 340/870.17, 539.22, 539.26, 539.27; 702/81
See application file for complete search history.

(56) References Cited

U.S. PATENT DOCUMENTS

| | | | |
|---|---|---|---|
| 5,950,437 A | 9/1999 | Turner et al. | |
| 6,089,146 A | 7/2000 | Nam et al. | |
| 6,225,908 B1 | 5/2001 | Lee et al. | |
| 6,555,789 B2 | 4/2003 | Owens et al. | |
| 6,859,745 B2 * | 2/2005 | Carr et al. | 702/81 |
| 6,970,100 B2 * | 11/2005 | Lovegreen et al. | 340/870.17 |
| 7,034,689 B2 * | 4/2006 | Teplitxky et al. | 340/572.7 |
| 2002/0040564 A1 * | 4/2002 | Killingbeck et al. | 53/416 |
| 2005/0248455 A1 * | 11/2005 | Pope et al. | 340/539.27 |
| 2005/0258961 A1 * | 11/2005 | Kimball et al. | 340/572.1 |
| 2006/0033630 A1 | 2/2006 | Lyall, III | |
| 2006/0122852 A1 * | 6/2006 | Moudy | 705/1 |
| 2006/0164239 A1 * | 7/2006 | Loda | 340/539.22 |
| 2006/0214788 A1 * | 9/2006 | Ku et al. | 340/539.26 |

* cited by examiner

*Primary Examiner*—Albert K Wong
(74) *Attorney, Agent, or Firm*—Meyertons Hood Kivlin Kowert & Goetzel, P.C.; Jeffrey C. Hood; Joel L. Stevens

(57) ABSTRACT

System and method for monitoring food storage bins. The system may include at least one food storage bin defining a volume usable to store food. Each food storage bin may also include at least one sensor usable to measure temperature within the volume. The system may include a transmitter/receiver operable to wirelessly transmit power to the at least one sensor and wirelessly receiver signals which include information regarding the temperature within the volume and/or the content of the food storage bin. The system may also include a controller coupled to the transmitter/receiver, operable to receive and/or determine information regarding the temperature, location, and/or content of the food storage bins via signals received from the transmitter/receiver. The controller may be operable to store the received information in a memory, e.g., comprised in or coupled to the controller.

25 Claims, 8 Drawing Sheets

SYSTEM AND METHOD FOR FOOD SERVICE STORAGE BIN MONITORING

FIELD OF THE INVENTION

The present invention relates to the field of food service and more particularly to a system and method for monitoring food storage bins.

DESCRIPTION OF THE RELATED ART

In recent years, the food service industry and the public have demanded that food services, e.g., restaurants, cafeterias, fast food stores, etc., maintain a strict adherence to health and safety regulations. In particular, food services should produce or present food that is safe to eat; in other words, the food should be kept under safe conditions and should not be left in states that may lead to bacterial colonization or other harmful effects. For example, in many cases, the food establishment may store food that is already cut or sliced, e.g., tomatoes, cucumbers, peppers, sliced meat, etc., in a food storage area or container/bin. In these cases, it is important that the food stay within regulation temperatures for health and safety reasons, as well as to maintain the reputation of the restaurant. More specifically, warm food should be kept at temperatures high enough to avoid growths, e.g., bacteria, mold, or other organism growths, especially over long periods of time. Similarly, cold food should be kept at or near an appropriate cold temperature as there is often a threshold temperature near room temperature at which bacteria and other organisms thrive.

To ensure that the food is maintained at appropriate temperatures, the store owner or manager will often have to devote personnel resources, and correspondingly, money, to measuring temperatures of the food or the food storage bin in which it is stored, e.g., using a temperature probe manually. The time and money required to perform these measurement tasks are often expensive for the manager of the store. As a specific example, when the lunch crowd arrives, the manager may need to devote all of his personnel resources to preparing food, cleaning, or other tasks in order to serve the customers in a timely fashion. As a result, the temperatures may not be measured as often as they should, which may result in non-compliance with health regulations and/or store policies, and possibly fraudulently recorded temperatures.

Thus, improved systems and methods for monitoring food are desirable.

SUMMARY OF THE INVENTION

Various embodiments of a system and method for food service storage bin monitoring are presented herein. Embodiments of the invention may be used in various applications, such as restaurants, grocery stores, fast food establishments, cafeterias, etc.

The system may include at least one food storage bin, each bin including a bottom portion and one or more side portions that define a volume usable to store food. The volume may take any of various shapes or sizes appropriate for storing produce, meat, or other items appropriate for storage. Additionally, the food storage bin may be insertable into a food storage bin receptacle, e.g., one that may store a plurality of food storage bins and may be operable to heat or cool the food storage bins to a desired temperature range. Furthermore, the food storage bin may include or be made of thermally conductive material, e.g., such that the heating and cooling provided by the receptacle is translated to the temperature of the food stored in the food storage bin.

The food storage bin may also include at least one sensor usable to measure temperature within the volume. In one embodiment, the sensor may be operable to receive power, e.g., via a coiled wire (or other antennae means) comprised in, or electrically coupled, to the sensor. When power is received, the sensor may transmit signals (e.g., wirelessly) comprising information regarding the temperature of the food storage bin. Alternatively, or additionally, the signals may include information regarding the contents and/or location of the food storage bin.

The sensor may be comprised in or coupled to the food storage bin via a variety of methods. For example, the sensor may be hermetically sealed in the bottom and/or the one or more side portions of the food storage bin. Note that other methods for sealing and/or coupling the sensor to the food storage bin are envisioned. Thus, the food storage bin may store a type of food and may include a sensor operable to transmit information regarding the food storage bin.

It should be noted that the food storage bin may include a member that extends into the volume of the food storage bin that is operable to conduct the temperature of the volume to the sensor. To achieve this, the member may include thermally conductive material which may be substantially the same temperature as the volume of the food storage bin.

Additionally, the system may include a transmitter/receiver operable to transmit power to the sensor and wirelessly receive the signals including information regarding the temperature, among other information. In some embodiments, the transmitter/receiver may be or may couple to a coiled wire comprised in or coupled to the receptacle. The transmitter/receiver may be any type of transmitter/receiver as desired.

In some embodiments, the system may also include a controller coupled to the transmitter/receiver. The controller may be operable to control provision of power to each of the sensor(s) and receive the information regarding the temperature, among other information, from the sensor(s). The controller may then store the received temperature readings in a memory, e.g., comprised in or coupled to the controller, e.g., via a coupled computer system. The controller may also be operable to determine the location, contents, pressure, and/or other information related to the food storage bin based on the signals received from the food storage bin, e.g., via the transmitter/receiver.

In one embodiment, the sensor, the transmitter/receiver, and the controller operate a plurality of times to measure temperature at a plurality of time periods. Thus, the system may be operable to monitor information regarding a plurality of food storage bins as described above.

In some embodiments, as indicated above, the controller may comprise and/or be coupled to a computer system. The computer system may include a processor, memory, a display, and a network interface. The memory may store information received or interpreted from signals received from the sensor. The controller/computer system may be operable to monitor the received temperatures and determine if handling of the food storage bin meets first criteria based on this monitoring. The criteria may relate to the temperature of the food stored in the food storage bin, e.g., based on the specific type of food, the washing temperature of the food storage bin, the serving temperature, and/or storage temperature of the food storage bin. The controller/computer system may provide an indication to a user if the handling of the food storage bin does not meet the criteria, e.g., a visual indication, such as on a display, or an audio indication. The controller/computer system may be operable to display information related to the received temperature readings and/or the signals transmitted from the at least one sensor on the display. More specifically, the display may indicate whether the food stored in the food storage bin has spoiled, the location, the temperature, and/or the content of the food storage bin, among others.

The controller/computer system may comprise an (embedded) web server and a network interface that may provide access to the information regarding the temperature over a wide area network (WAN), e.g., the Internet. Thus, information regarding the signals retrieved from the sensor may be accessible from remote locations, e.g., through a web browser. The memory may also include information identifying the food establishment which includes the system. A client computer system may execute a web browser to access the temperature information, and may further execute an application that monitors the received temperature data and determines compliance with certain criteria or regulations.

A method for configuring a food storage area may include installing a plurality of food storage bins into a food storage bin receptacle, where each food storage bin may include a sensor operable to wirelessly receive power and wirelessly transmit signals which may include information regarding temperature of the food storage bin. The method may then include configuring the food storage bin receptacle to include a transmitter/receiver, which may be operable to transmit power to each of the plurality of food storage bins and receive signals from each of the plurality of food storage bins, and configuring a controller to control the and record the information regarding the temperature of each of the plurality of food storage bins. The system may be operable to monitor food stored in the plurality of bins in order to ensure that the food is safe for consumption, as described herein.

A method for retrofitting a food storage bin to include a sensor may include first removing a portion of the food storage bin, e.g., a bottom or one or more side portions. Subsequently, a replacement portion may be added to the food storage bin to form a new storage bin. The replacement portion may include at least one integrated sensor, similar to the sensors described above, which may be operable to wirelessly receive power and wirelessly transmit signals comprising information regarding temperature of the food storage bin, among other information. In some embodiments, the sensor may be hermetically sealed within the replacement portion, and at least a portion of the replacement portion may include thermally conductive material, e.g., to allow efficient heating and/or cooling of the food stored in the new food storage bin. As indicated above, the new food storage bin may be usable in a food monitoring system to maintain a log of temperature information of food stored in the new food storage bin. A method for manufacturing a food storage bin may comprise integrating a sensor into the bin during construction as described herein.

Thus, various systems and methods may be used to monitor food storage bins to ensure food quality and adherence to health and safety regulations.

BRIEF DESCRIPTION OF THE DRAWINGS

A better understanding of the present invention can be obtained when the following detailed description of the preferred embodiment is considered in conjunction with the following drawings, in which.

Figure 1:
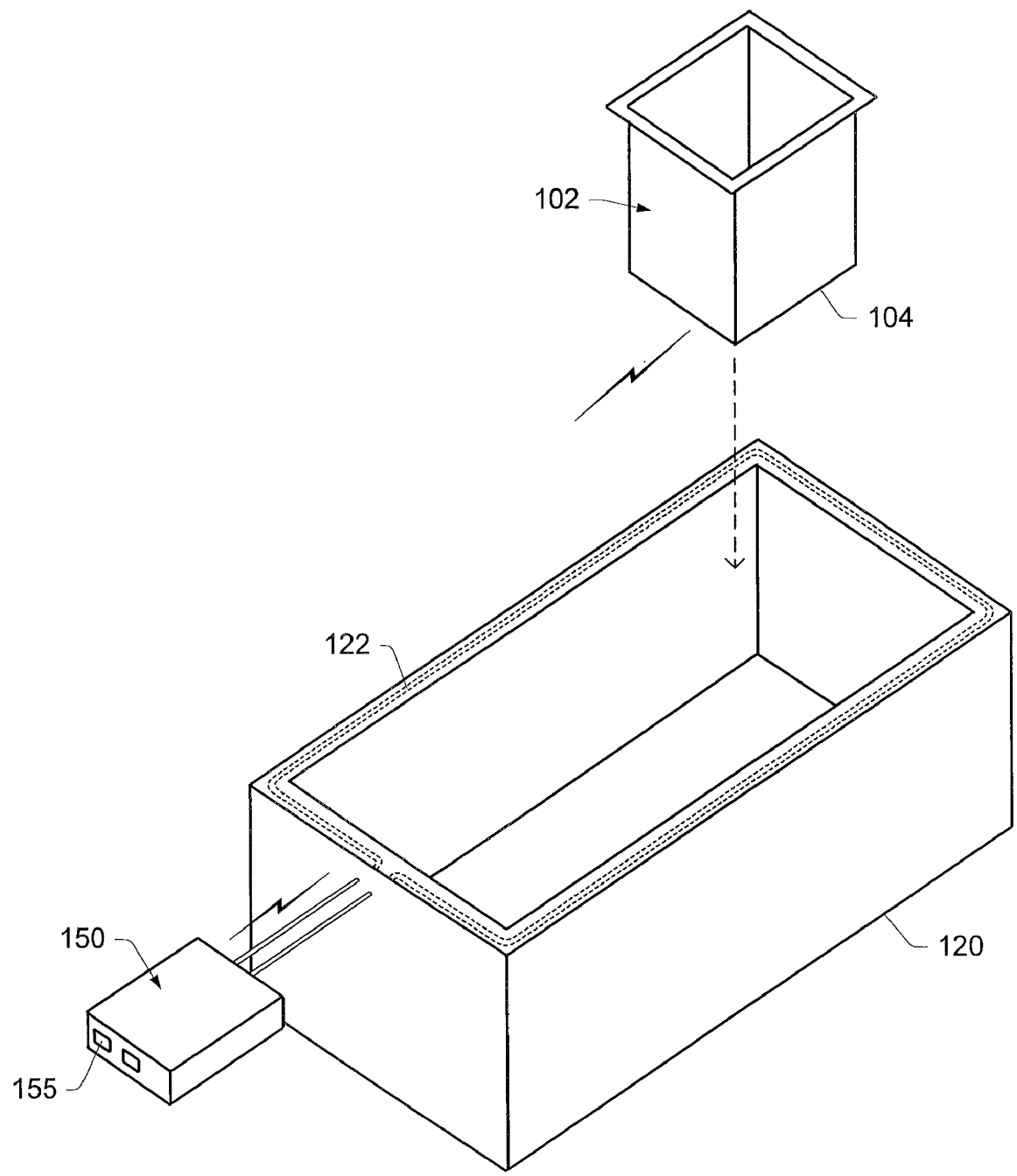
FIG. 1 illustrates an exemplary food storage bin and food storage bin receptacle suitable for implementing various embodiments of the invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical communication medium such as a bus, network, and/or other physical transmission medium that carries signals such as electrical, electromagnetic, or digital signals.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium and/or a programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

Graphical User Interface Element—an element of a graphical user interface, such as for providing input or displaying output. Exemplary graphical user interface elements comprise input controls and output indicators.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

FIG. 1—Exemplary Food Storage Bin and Food Storage Bin Receptacle

FIG. 1 illustrates an exemplary food storage bin 102 and food storage bin receptacle 120, "the receptacle", suitable for implementing some embodiments of the present invention. As shown, the food storage bin 102 may be insertable into the receptacle 120 and may include at least one sensor 104 for receiving power and transmitting signals that include information regarding the food storage bin, e.g., the temperature of the food stored in the bin. In one embodiment, at least a portion of the food storage bin 102 may comprise thermally conductive material, e.g., to allow for easy cooling/heating, e.g., via the cold/hot receptacle storing the food storage bin.

In some embodiments, the food storage bin 102 may include a bottom portion and one or more side portions usable to define a volume for storing food. Note that the food storage bin, and correspondingly, the bottom portion and/or the one or more side portions may form or take any of various shapes for storing a variety of food types. For example, the food storage bin 102 may be an open ended rectangular prism as shown in FIG. 1. Alternatively, the food storage bin 102 may take the shape of a rounded flask, e.g., semi-spherical, or any of various other geometric shapes, e.g., triangular, pentagonal, etc. In other words, the shape of the food storage bin is in no way limited to the food storage bin 102 shown in FIG. 1, and may take any appropriate shape for storing food or other materials/goods. A food storage bin having a bottom portion and one or more side portions is intended to include any of the various shapes as described herein, as well as others. Further descriptions of the food storage bin will be presented below.

The receptacle 120 may be shaped to appropriately receive one or more food storage bins such as, for example, the food storage bin 102 shown in FIG. 1; however, the receptacle 120 may be shaped in any of numerous ways to accept different shaped food storage bins, such as those described above, among others. As shown, the bins are configured to be integral with an opening of the receptacle 120. According to one embodiment, the receptacle 120 may include a transmitter/receiver for transmitting and receiving signals and/or power to and from the food storage bin 102, e.g., via the sensor 104 comprised in or coupled to the bin. In one embodiment, the transmitter/receiver may be or comprise one or more coiled wires 122, e.g., for transmitting power to the sensor 104, and optionally, receiving signals from the sensor 104. However, the transmitter/receiver may be any of various transmitter/receivers, e.g., electronic transmitter/receivers which are included in the sensor 104 or other antennae. Additionally, or alternatively, in some embodiments, the transmitter/receiver may reside in locations other than the receptacle 120. For example, the transmitter/receiver may also be positioned in various food storage areas (e.g., freezers, ovens, warming/cooling plates, etc.), washing areas (e.g., near dishwashers, sinks, and/or other cleaning areas), and/or other areas. The sensor 104 may generate signals in a wireless manner, which may optionally be received by the coiled wires 122 which may act as an antenna. The transmitter/receiver, e.g., the one or more coiled wires 122, may be positioned in/on the receptacle 120 (or elsewhere) such that sufficient power may be transmitted to the sensor 104. For example, in one embodiment, the at least one sensor 104 included in or coupled to the food storage bin 102 and the one or more coiled wires 122 may be positioned substantially parallel to one another in order to maximize power transmission from the transmitter/receiver to the sensor 104.

Note, however, that the coiled wires 122 and the sensor 104 may not always be parallel, and that other positions or arrangements are envisioned. In other words, the coiled wires 122 and the sensor 104 may be placed in any of numerous positions or arrangements. For example, in one embodiment, the coiled wires 122 may be arranged on the sides and/or bottom of the receptacle 120. Additionally, or alternatively, the coiled wires 122 may be arranged such that there is a coiled wire (of the coiled wires 122) associated with each of a plurality of food storage bins. In other words, the transmitter/receiver may couple to a plurality of coiled wires each operable to transmit power and receive signals from a respective sensor comprised in a respective food storage bin. However, in one embodiment, each coiled wire may correspond to a plurality of sensors comprised in respective food storage bins for transmission/reception. Thus, the relationship and position of the food storage bins, e.g., the sensors comprised therein or coupled thereto, with respect to the transmitter/receiver, e.g., the coiled wires 122, may be any of various relationships and positions and is not limited to the descriptions herein.

Additionally, the transmitter/receiver, e.g., the coiled wires 122, may be coupled to or included in a controller 150, operable to control provision of power to the sensor 104, receive the information regarding the food storage bin via the transmitter/receiver, and/or store corresponding information in a memory, e.g., comprised in or coupled to the controller. Note that the controller 150 may be coupled to the transmitter/receiver in a variety of ways and is not limited to the coupling illustrated in FIG. 1. For example, the controller may be further removed from the receptacle 120, or may communicate with the transmitter/receiver wirelessly, among other methods. Additionally, or alternatively, the controller 150 may include ports 155 operable to provide communications between the controller and other devices. Further descriptions of the controller are provided below.

It should be noted that the above described relationships between coiled wires and sensors correlate to the ability, e.g., by the controller 150 coupled to the transmitter/receiver, to determine the location of the food storage bin. For example, where there are coiled wires for each of a plurality of food storage bins, the specific location of the food storage bin may be determined. However, when fewer coiled wires are used, such as in FIGS. 2 and 3 described below, a more relative location of the food storage bin may be determined, e.g., such as quadrant information. Note that the descriptions above do not limit the ability to determine location of the food storage bin(s), and that other methods for location are envisioned; for example, in one embodiment, signals transmitted by the respective sensors in the plurality of storage bins may include location information.

Figure 2:
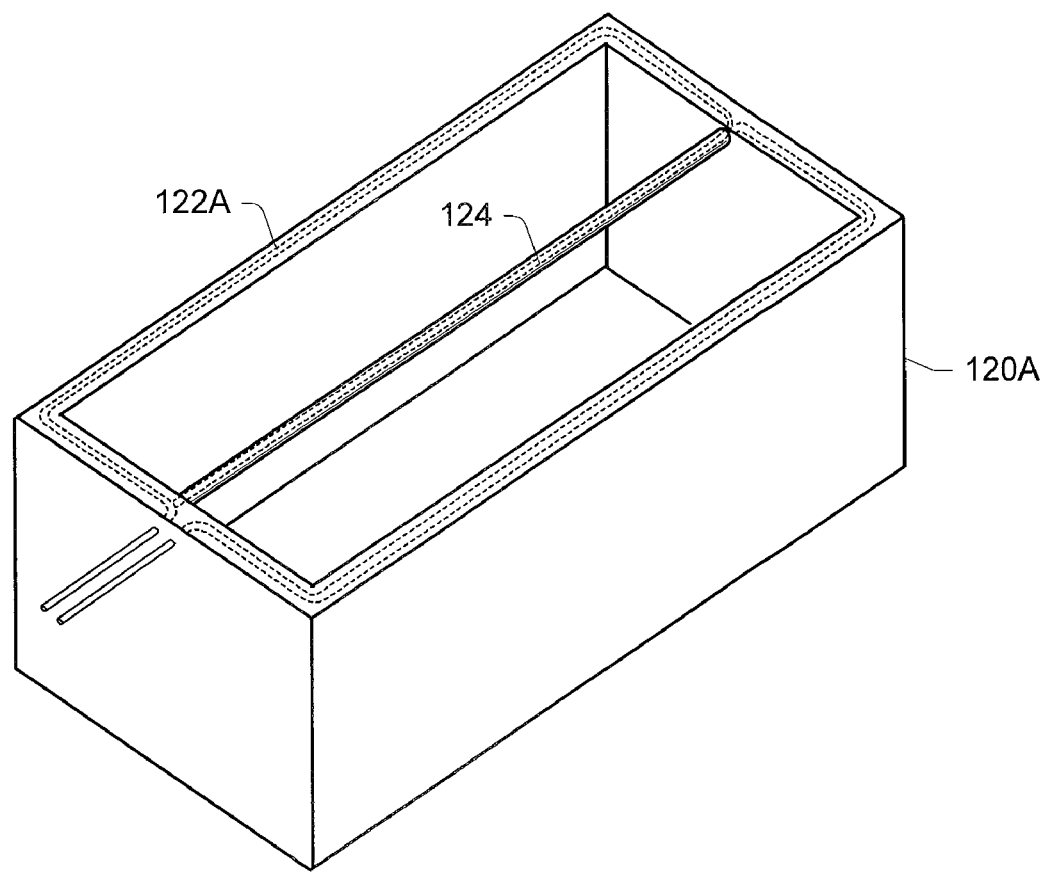
FIGS. 2 and 3 illustrate different views of another food storage bin receptacle according to one embodiment.
Figure 3:
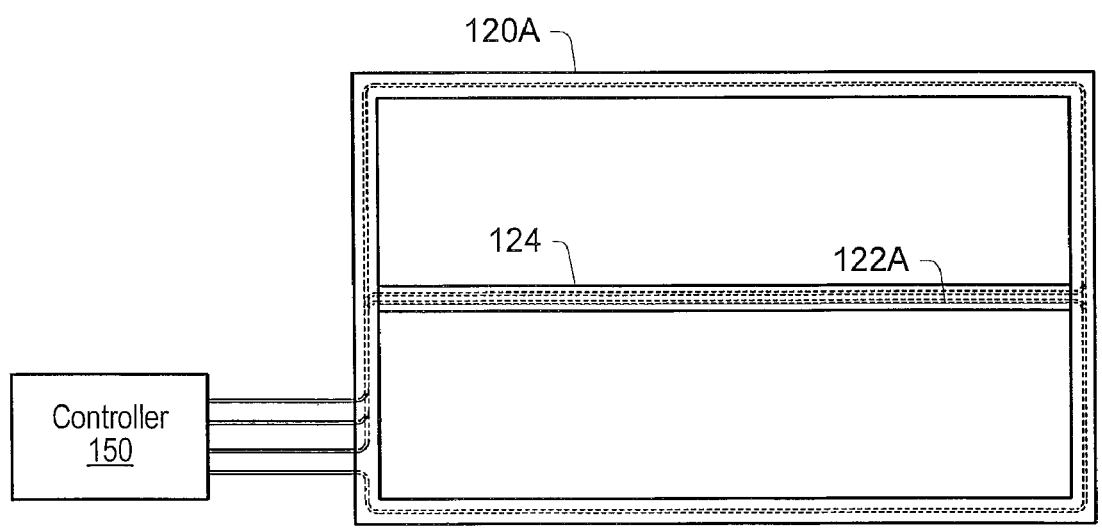

FIGS. 2 and 3—Exemplary Food Storage Bin Receptacle

FIGS. 2 and 3 illustrate two perspectives of an exemplary food storage bin receptacle 120A. Note that the forgoing descriptions of the receptacle 120 may apply to the receptacle 120A; for example, the receptacle 120A may also be shaped to receive one or more food storage bins of various shapes and comprise or couple to a transmitter/receiver. As shown in FIGS. 2 and 3, the receptacle 120A may include a support bar 124 operable to support one or more food storage bins, such as food storage bin 102. Similar to above, the transmitter/receiver may be or comprise one or more coiled wires 122A comprised in the receptacle 120A; additionally, the coiled wires 122A may also be comprised in or coupled to the support bar 124 as illustrated. Furthermore, more than one support bar or other suitable structure, possibly comprising or coupled to the transmitter/receiver, e.g., the coiled wires 122A, may be present in the receptacle 120(A), as required. Note, however, that, as described above, the position of the coiled wires 122A and the sensor 104 may be positioned or arranged in any suitable configuration. For example, in one embodiment, the coiled wires 122A may be comprised in the side or bottom portions of the receptacle 120A; in other words, the coiled wires may be coupled to or comprised in any suitable position of the receptacle 120A. Additionally, as shown in FIG. 3, the transmitter/receiver, e.g., the coiled wires 122A, may be coupled to the controller 150 similar to the couplings described above, among others. Thus, the receptacle 120A may take various shapes, house one or more food storage bins, and include or couple to a transmitter/receiver for transmitting power to the sensor 104 and for receiving signals regarding the food storage bin 102.

In some embodiments, the receptacle may also be (or be stored in) various cooling and heating systems, e.g., freezers and ovens, e.g., walk in freezers and ovens, washing areas, and/or other places for storing/cleaning the food storage bin(s). In other words, the receptacle may include any appropriate area where the storage bins are utilized; however, in alternate embodiments, the receptacle may be limited to systems for storing one or more food storage bins.

Further descriptions of the controller and the operation of the system will be described in more detail below.

Figure 4:
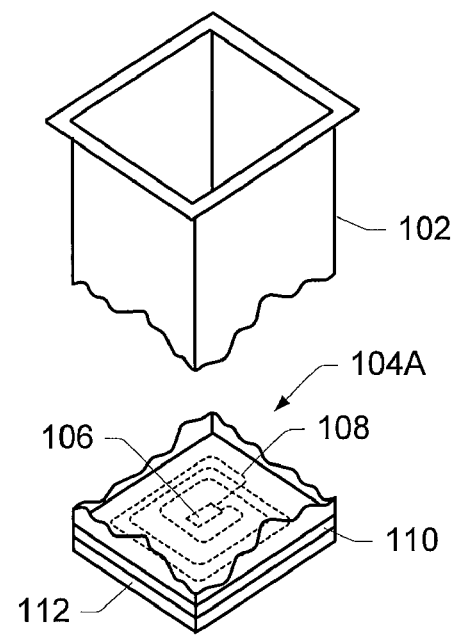
FIG. 4 illustrates an exemplary food storage bin with a sensor according to one embodiment.

FIG. 4—Exemplary Food Storage Bin with Sensor

FIG. 4 is a cutaway view that illustrates the exemplary food storage bin 102 with an exemplary sensor 104A. As indicated above, the food storage bin 102 may include the sensor 104, e.g., the sensor 104A illustrated in FIG. 4, which may be operable to receive power and transmit signals which include information regarding the food storage bin, e.g., wirelessly. The sensor 104A may be included in or coupled to the food storage bin in a variety of ways. For example, in one embodiment, the sensor 104A may be coupled to the food storage bin via various methods, e.g., wire, Velcro™, adhesive, etc., and may be removed before being exposed to extreme conditions, e.g., before being washed. However, in some embodiments, the sensor 104A may be sealed, e.g., hermetically, within one or more of the side portion(s) or the bottom portion of the food storage bin 102. As shown, in one embodiment, the sensor 104A may be sealed between two layers, e.g., layers 110 and 112, in the bottom portion of the food storage bin 102.

Note that the sensor may be sealed in the food storage bin via numerous methods; for example, as indicated above, in one embodiment, the sensor 104A may be hermetically sealed in one of the portions of the food storage bin 102, e.g., in the bottom portion as illustrated in FIG. 4. Note further that the sensor 104A may be sealed in any appropriate way such that washing, storing, and using the food storage bin 102 may not adversely affect the sensor 104A. In other words, the sensor 104A may still be operable after the food storage bin 102 is washed in a conventional or industrial dishwasher. Said another way, the sensor 104A may be included in or coupled to the food storage bin 102 in a way that allows the food storage bin 102 to be used as if the sensor 104A were not present, and, correspondingly, the sensor 104A may remain completely functional and operational throughout, i.e., without any ill effects.

Additionally, or alternatively, the sensor 104A may be placed in the food storage bin 102 without being coupled or sealed in the food storage bin 102. For example, in one embodiment, the sensor 104A may simply be put into the food storage bin 102 loosely, e.g., manually placed in the bottom of the bin, for easy insertion and removal. Similar to above, placing the sensor 104A in the food storage bin, e.g., loosely, may not cause any ill-effects for the food storage bin. Additionally, in some embodiments, the sensor 104A may include a portion or side that allows the sensor 104A to removably attach to the food storage bin 102, e.g., using Velcro™, or a removable adhesive (e.g., which does not impose health risks), etc. In another embodiment, the food storage bin may include a recessed area in which the sensor may be placed, wherein the sensor has a shape that corresponds to the shape of the recessed area, and where the recessed area operates to maintain the sensor in that location of the bin.

The sensor 104A may be a durable sensor (e.g., one that can withstand washing and/or wide temperature variance, among other conditions) such that normal use and wash of the food storage bin 102 is not affected when the sensor 104A is loosely included or attached to the food storage bin 102. In other words, the sensor 104A may be placed in the food storage bin 102 and still allow the food storage bin 102 to be used normally. Alternatively, the sensor 104A may be (or need to be) removed when the food storage bin should be washed. In further embodiments, the sensor 104A may simply be a disposable sensor that may be thrown out after use (e.g., after a single user or a specified number of uses). Thus, according to various embodiments, the at least one sensor 104 may be included or placed in the food storage bin in a variety of ways and withstand a wide variety of conditions.

As used herein, a sensor "comprised in" the food storage bin may refer to sensors that are attached to or coupled to the food storage bin, and are not easily removable. Examples of sensors "comprised in" the food storage bin include sensors that are sealed, e.g., hermetically sealed, within the bin and sensors fixedly attached to the bin (and not readily removable by the user, e.g., without a tool), e.g., fixedly attached using glues, mechanical means, e.g., screwed onto the surface of the bin (with a screwdriver), etc. Sensors "placed in" the food storage bin may refer to sensors that are manually placed in/removable from the food storage bin, e.g., loose sensors (disposable, durable, or other type) that may be easily placed or removed in the food storage bin, e.g., by a human manually removing the sensor. One example, would be a sensor that the user can simply drop into the bottom of the bin, or place in a slot of the bin.

Figure 5:
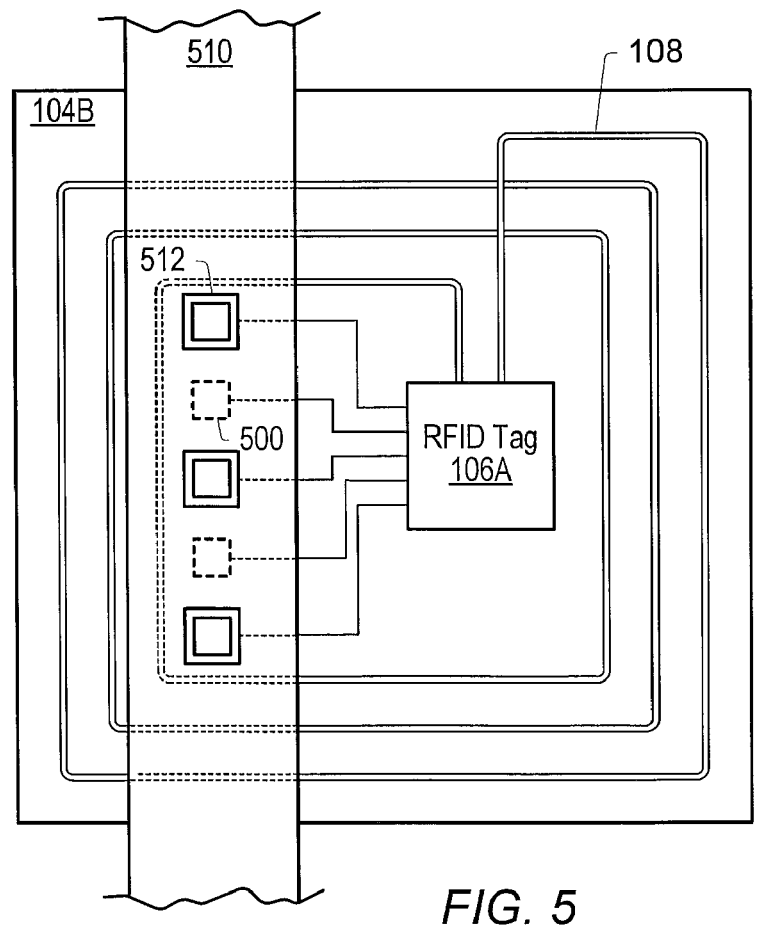
FIG. 5 illustrates an exemplary sensor according to one embodiment.

As indicated above, the sensor 104A may wirelessly receive power from the transmitter/receiver, e.g., via a sensor coiled wire 108 electrically coupled to or included in the sensor. Said another way, in one embodiment, the sensor 104A may include or electrically couple to the coiled wires 108, which may wirelessly receive power from the coiled wires 122. More specifically, the receptacle 120A may include a transmitter/receiver operable to transmit power to the sensor; more specifically, the receptacle may include one or more coiled wires 122 which may induce an electrical current in the sensor, e.g., via the coiled wires 108 comprised in or coupled to the sensor, to power the sensor. Following the descriptions above, in some embodiments, the sensor 104A may be a passive sensor, i.e., the sensor may not include a power supply. For example, in one embodiment, the sensor may include an identification tag 106, e.g., a radio frequency identification (RFID) tag 106A, as illustrated in FIG. 5. Thus, according to one embodiment, the sensor 104 may receive power from the transmitter/receiver via the sensor coiled wires 108, and the identification tag 106 may be operable to transmit signals including information regarding the food storage bin 102 to the transmitter/receiver, e.g., via the coiled wires 122.

For example, the transmitter/receiver may be or include the coiled wires 112 which may act as a transmitter of power to the sensor, and correspondingly, the sensor may receive the power via an induced electrical charge in its own coiled wires 108. Once the sensor has received the power from the transmitter/receiver, it may send signals to the coiled wires 112 which may now act as an antenna for receiving the signals from the sensor, e.g., to be transferred to the controller. In some embodiments, the sensor 104A may include wireless communication logic for receiving/transmitting signals from/to the transmitter/receiver. Alternatively, or additionally, the sensor 104A may include wireless communication logic for receiving and/or transmitting signals from and/or to the controller 150 directly, i.e., without using the transmitter/receiver. Note, however, that the above descriptions are exemplary only; and, in fact, the sensor 104A may receive or store power and transmit signals via a variety of other means. For example, in some embodiments, the sensor 104A may include a battery or other storage device for receiving and storing power. In some embodiments, the battery or other storage means may be charged via wired or wireless means. Thus, the transmitter/receiver may transmit power to and receive signals from the sensor 104A using a variety of methods.

In some embodiments, the sensor 104A may be usable to measure temperature within the volume, and the signals to the transmitter/receiver may include information regarding the temperature. Additionally, or alternatively, the signals may include information regarding contents stored in the food storage bin 102, e.g., what type of food is stored in the food storage bin, information regarding the location of the food storage bin, and/or weight/pressure of the contents (e.g., over time measurements), fullness of the food storage bin 102, and/or other information. For example, if the food storage bin 102 is three-quarters full of tomatoes (e.g., 1.5 pounds) which are currently stored at 44 degrees and located in, for example, the top right quadrant of the receptacle, the sensor 104A and/or the transmitter/receiver may be operable to convey that information to the controller. Further descriptions of this functionality will be provided in more detail below.

FIG. 5—Exemplary Sensor

FIG. 5 illustrates an exemplary sensor 104B, including the RFID Tag 106A as well as coiled wire 108. Note that the foregoing descriptions of the sensor 104 and 104A may also apply to the sensor 104B, and in fact, that any of the descriptions of the sensors 104, 104A, and 104B may apply to any other sensor 104(A-B). As shown, the sensor 104B may include blocks, such as block 502, coupled to the RFID tag. Additionally, the sensor 104B may be covered by or include a plate 510, e.g., a conductive or metal plate, among others. The plate 510 may include cutouts, such as cutout 512, which correspond to one or more of the blocks. Thus, during transmission of signals from the sensor to the transmitter/receiver, the signal(s) may be modified by due to the presence of the plates. For example, the controller and/or the transmitter/receiver (among other means) may detect a substantial capacitance difference to determine presence or absence of the plate/cutout. Thus, the transmitter/receiver may receive/detect signals that are substantially different due to the type of plate used for each sensor, e.g., based on the position of the cutouts. Correspondingly, the controller may be able to distinguish different signals from sensors with different plates in order to identify the type of food stored in the food storage bin. For example, each food storage bin may be labeled for a food type, and the respective sensor associated with that food type, e.g., differentiated by the plate on the sensor, may be used in the food storage bin. Thus, when a temperature (among other information) is transmitted to the transmitter/receiver, it may be possible to determine which particular food type the signals represent.

In some embodiments, the sensor may also be operable to transmit weight or pressure information to the transmitter/receiver. For example, the sensor may detect the amount of weight of the contents of the food storage bin. In one embodiment, the food storage bin may have a moveable layer which resists movement (e.g., using a spring). The moveable layer of the food storage bin may be flexible and may include a plurality of gaps or holes such that efficient cleaning (i.e., underneath the partition) may be easily performed. In some embodiments, the sensor may be operable to measure the amount of resistance of the bottom of the food storage bin and transmit that information to the transmitter/receiver. Alternatively, or additionally, the sensor may optically measure the fullness of the food storage bin 102 (e.g., when the food storage bin is somewhat transparent). More specifically, the sensor may be operable to detect a change in light intensity at the level of the contents of the food storage bin 102. For example, if the contents are filled half-way in the food storage bin, the sensor may detect that there is more light coming through the food storage bin above the half-way mark than below the half-way mark. In some embodiments, the sensor may measure the level precisely or may measure the level according to specified fractions, e.g., halves, quarters, eighths, etc.

In one embodiment, the sensor may be located below a partition of the food storage bin 102. The partition of the food storage bin 102 may include a portion which may reflect a signal back to the sensor upon transmission and/or may move according to the pressure/weight provided by the contents of the food storage bin 102. For example, the portion may not reflect the signals directly back to the sensor when there is more weight on the partition. More specifically, when there is more weight on the partition, the partition may bend or strain under the weight thereby changing the angle (in various portions) of the partition. Correspondingly, the sensor may detect that the signal, e.g., an optical or other electromagnetic signal (among others), no longer reflects directly back to the sensor. The sensor may then be able to measure the degree of change in the reflection and determine a weight or pressure of the food contents in the food storage bin 102.

In some embodiments, the sensor may simply measure strain on the bottom, the moveable bottom, and/or the partition of the food storage bin 102. As indicated above, the strain may be measured by determining the physical resistance associated with the bottom and/or partition (e.g., where the contents of the food storage bin rests). Alternatively, or additionally, if the bottom and/or the partition is conductive, the strain may be measured by modulating the capacitance of the bottom/partition and/or by measuring the modulation of the capacitance. Thus, weight, pressure, and/or fullness of the contents of the food storage bin may be measured and transmitted to the transmitter/receiver by the sensor, according to various embodiments.

In some embodiments, further information may be measured by the sensor. For example, the sensor may be operable to measure and transmit signals concerning pH of the food (e.g., which may be especially useful with food that includes or is liquid), or presence or absence of various chemicals and/or biological organisms, among others. For example, a Clark electrode or chemical sensor, e.g., a ChemFET (Chemical Field Effect Transistor), may be used or included e.g., in the sensor, to measure various chemicals, byproducts of organisms, or organisms themselves. More specifically, in one embodiment, various chemical compounds or other indicators (e.g., proteins or enzymes) may be attached to the surface of the Clark electrode which may be used as indicators of the various chemicals and/or biological organisms. In some embodiments, the use of ChemFETs with indicators may require that the sensor be treated or disposed of after a number of uses; however, in alternate embodiments, the attached indicator may be durable to last an indefinite period of time. Alternatively, or additionally, a ChemFET may be used to detect various desired atoms, molecules, ions, etc. Thus, one or more specific chemicals or biological compounds/organisms may be detected via various means, such as those described above, among others. Note that the term "chemical" may refer to any of various materials inorganic or organic. For example, as used herein, "chemical" may include both transition metal compounds, biological compounds (e.g., proteins, enzymes, etc.), or gasses, among others. "Biological organisms" may include viruses as well as organisms normally included in the biological kingdom. In some embodiments, the detection of various chemicals may indicate the presence of biological organisms. As a specific example, the sensor may be able to detect various enzyme byproducts of a bacterial colony or virus (or the colony itself), e.g., *E. coli*, and that information may be monitored and/or indicated, e.g., using the systems and methods described herein. Thus, in various embodiments, chemicals and biological organisms may be monitored, e.g., in addition to the physical measurements described above.

Note that the above descriptions are exemplary only, and that other methods for transmitting content, temperature, pressure, weight, fullness, and/or location, among others, are envisioned. For example, in one embodiment, the sensor may transmit various signals including information about various aspects of the food storage bin by enumerating them in bit portions of the transmitted signal. For example, in one embodiment, the sensor may transmit signals, e.g., to the controller via the transmitter/receiver, which include a portion for identification of the food storage bin, a portion for conveying information about the temperature of the food storage bin, e.g., the contents thereof, a portion indicating the location of the food storage bin, and/or a portion for conveying information regarding the contents of the food storage bin. Note further that these bit descriptions are not limiting to the methods for signal transmission from the sensor, and that other orders, bit patterns, etc. are envisioned.

Figure 6:
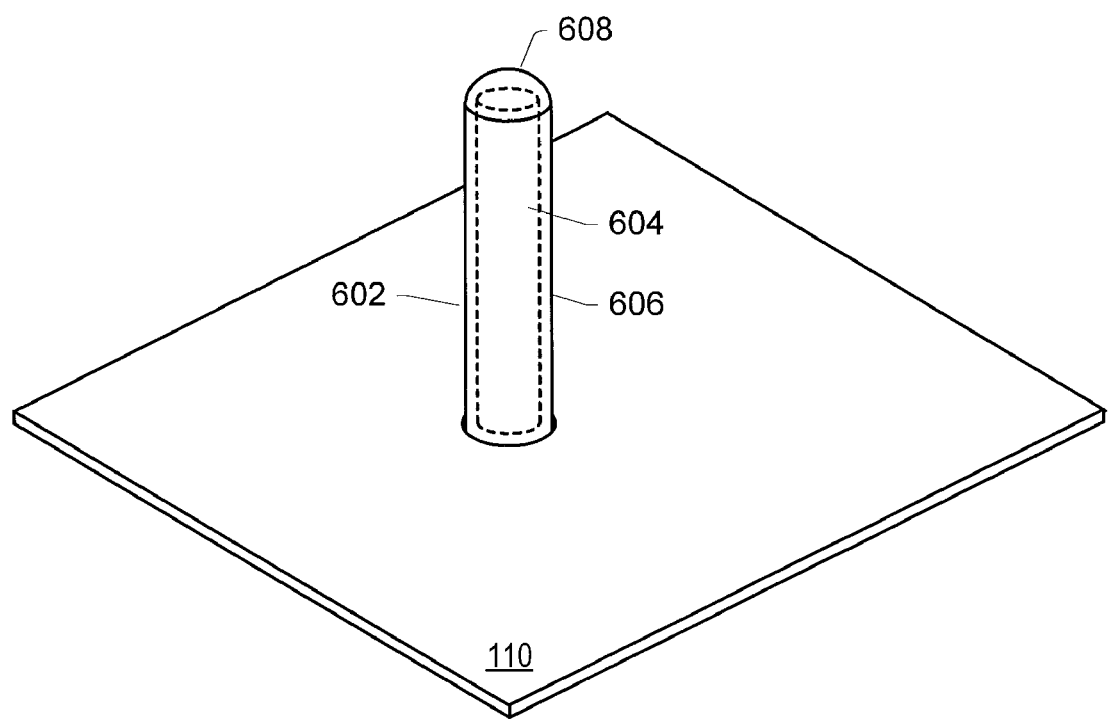
FIG. 6 illustrates an exemplary bottom of a food storage bin according to one embodiment.

FIG. 6—Exemplary Food Storage Bin Bottom

FIG. 6 illustrates an exemplary bottom portion of the food storage bin 102 for measuring the temperature of the inside of the food storage bin. As illustrated, the food storage bin may include a member 602 which extends or projects into the volume of the food storage bin (not shown for simplicity). Following the descriptions above, the bottom and/or the member 602 may be or interact with the partition above to measure weight/pressure of the food storage bin. Additionally, as shown, in some embodiments, the member may extend from the bottom portion of the food storage bin; however, it should be noted that in other embodiments, the member, or some other temperature reading device, may extend from one or more of the bottom portion or the one or more side portions of the food storage bin. Note that in some embodiments, where the member 602 extends from a side portion of the food storage bin, the food storage bin housing the member and the receptacle may be keyed such that the food storage bin may only be inserted into the receptacle in one orientation. This keyed method may allow the coiled wires to communicate with the food storage bin more efficiently than the random orientation that would result without a keyed insertion. Thus, the member may extend from one or more of the bottom and side portions of the food storage bin, and the food storage bin/receptacle may be appropriately keyed for power reception and signal transmission.

As shown, in one embodiment, the member 602 may include an inner material 604 operable to thermally conduct the temperature inside the food storage bin to the sensor, which may be surrounded by insulating material 606 to prevent temperature reading errors. The member may include a top portion 608, e.g., for covering/protecting the inner material 604, which may also include thermally conductive material, e.g., to conduct the inside-temperature of the food storage bin to the inner material 604. Thus, according to one embodiment, the bottom portion (or others) may include a member which is operable to conduct the temperature of the inside of the food storage bin to the sensor. In some embodiments, the member may also be able to detect, e.g., via the sensor, the fullness of the food storage bin 102 (e.g., by degree of transparency) and/or weight and pressure of the contents of the food storage bin 102.

Note that the member 602 may be any desirable height, such that the temperature measured indicates the temperature of the inside of the food storage bin at any desired location. This may be especially desirable in following particular health and safety guidelines set forth by various institutions. For example, in some cases, a specific vegetable, or other meat or produce, may require that the temperature remain below 45 degrees, or, for example, above 140 degrees, as measured at two inches from the bottom. In this case, the food storage bin may include a member that extends from the bottom portion two inches such that the sensor reads and transmits signals which include the temperature of the food storage bin at that location. Note that other locations and temperatures are possible, and that the member may be implemented in any of various ways or shapes in order to provide the desired measuring ability.

Furthermore, in some embodiments, the member 602 may be a part of the sensor, and may be able to measure the temperature, fullness, pressure, and/or weight of the food storage bin (and/or contents thereof) at the desired location and transmit that information to the sensor for transmission to the transmitter/receiver. Said another way, the member may be used for any of various purposes, e.g., measuring the temperature of the inside of the food storage bin, and may take on any required shape or functionality to achieve that purpose. In other words, the member 602 is not limited to the above descriptions and other shapes, purposes, and implementations are envisioned.

Controller

In some embodiments, as shown in the preceding Figures, the receptacle 120(A) may be coupled to the controller 150, operable to control the transmitter/receiver and/or the at least one sensor 104 comprised in or coupled to the food storage bin 102. The controller 150 may include a processor and memory for performing various embodiments of the present invention. Alternatively, or additionally, the controller 150 may include a programmable hardware element, e.g., a field-programmable gate array (FPGA), which may be programmed to perform various control or monitoring functions, among others. In some embodiments, the controller may be comprised in a slim case, e.g., about 6"×4"×1.5"; alternatively, or additionally, the controller may be or include a computer system. Note that the controller may include one or more ports 155, e.g., for communication, such as Ethernet port(s), modem port(s), e.g., for communicating over telephone lines, USB ports, or other serial/parallel ports, among others. These ports 155 and their respective communication devices may be used to communicate over various networks, e.g., local area networks (LANs), wide area networks (WANs), e.g., the Internet, etc. Additionally, or alternatively, the controller 150 may include one or more wireless communication devices, e.g., for communicating with the transmitter/receiver and/or other computer systems/devices wirelessly. The wireless devices may implement Infrared (IR/IrDA), Bluetooth, radio, WiFi, WiMAX, RFID, 802.11, DECT, and/or other wireless communication protocols. More specifically, in one embodiment, the controller may couple to another computer system via the ports/networks described above, among others.

Note that the computer system(s) described above may be any of various computer systems. In one embodiment, the computer system(s) may each include at least one memory medium on which one or more computer programs or software components according to one embodiment of the present invention may be stored. For example, the memory medium may store one or more programs which are executable to perform at least a portion of the methods described herein. The memory medium may also store operating system software, as well as other software for operation of the computer system. Additionally, the memory medium may store information regarding one or more food storage bins' temperature, content, and/or location. Note that in embodiments where the systems described herein are stored in a food establishment, the memory may also store information identifying the food establishment, e.g., via an identification number or name. Various embodiments further include receiving or storing instructions and/or data implemented in accordance with the foregoing description upon a carrier medium.

Figure 7:
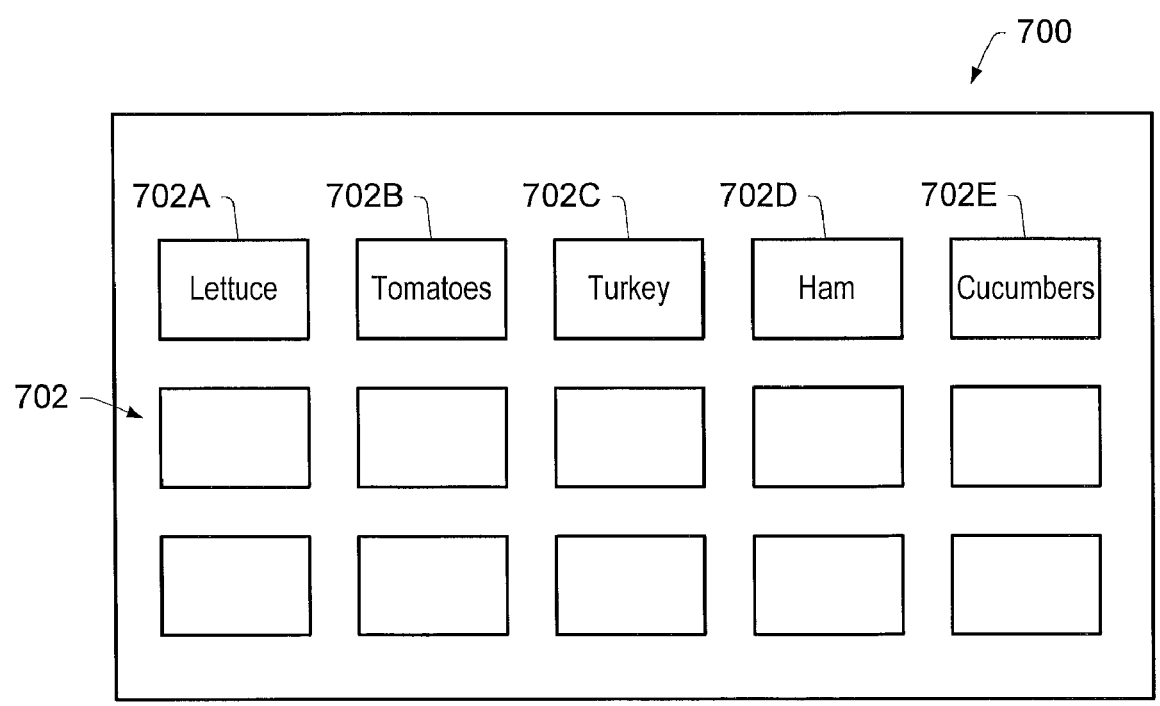
FIG. 7 illustrates an exemplary monitoring screen according to one embodiment.

In some embodiments, the computer system(s) may each include a display device, e.g., operable to display information corresponding to the food storage bin 102, e.g., based on the information transmitted by the sensor. FIG. 7 illustrates one embodiment of such a display 700. As shown, the display 700 may include one or more boxes which convey information corresponding to a plurality of food storage bins, such as the food storage bin 102. More particularly, the display 700 includes boxes 702 corresponding to food storage bins storing various food products, e.g., box 702A which may display information regarding lettuce stored in one of the food storage bins, 702B for tomatoes stored in another food storage bin, 702C for Turkey, 702D for Ham, and 702E for cucumbers. Note that the food products shown in the display 700 are exemplary only, and that other produce or items for storage are envisioned.

According to one embodiment, the display 700 may change the color or display of one of the boxes 702 to convey the status of the food. For example, the display 700 may display the boxes 702 with a green background, indicating that the food is within the predetermined range of temperatures for the food, e.g., as set by health and safety regulations. However, when the controller detects that the food is outside of the predetermined range, it may change the background to red, thereby alerting a user or manager of a problem with the food storage bin. In some embodiments, the controller may not immediately change to a red background when the food is outside of the predetermined range; for example, the controller may be configured to change to red only after the food has been outside of the range for a certain length of time. This may be desirable so as to avoid wasting food when the food inside of the bin has only experienced a brief fluctuation in temperature and has not actually spoiled. Additionally, or alternatively, the display may use other methods for indicating the states of the food storage bin (or the food stored therein) and is not limited to the above descriptions. For example, in one embodiment, the display may show the state of the food by using an icon system, e.g., using a "checkmark" icon when it is good and an "x" when it is bad. Note further that other states may be shown on the display; for example, the display may also indicate when the food is nearing the limits of the predetermined range, e.g., by using a different icon, or, for example, using a yellow background, among other methods.

One or more of the display device(s) may also be operable to display a graphical user interface (GUI) or front panel for displaying the information corresponding to the food storage bin 102. The GUI may comprise any type of graphical user interface, e.g., depending on the computing platform. Following the examples above, a user, e.g., a manager or storeowner, may be able to change parameters of the display 700, e.g., the array of boxes 702 and their respective labels, or change the information displayed on the display 700 via a GUI of the computer system(s), e.g., the controller, or a computer coupled to the controller. For example, the user may be able to interact with the GUI to get further information, such as, for example, a log of temperatures over a set of times for one or more of the food storage bins. Thus, according to some embodiments, the computer system(s) may include display devices operable to display a GUI and/or a display indicating the current status of the food storage bins and/or the food stored therein.

Additionally, in some embodiments, the controller, and/or the coupled computer system may include a web server, e.g., program instructions stored in the memory medium, which may allow remote users or systems to access the information stored in the memory medium, e.g., information regarding the temperatures, content, and/or location, among others, of the food storage bin. Embodiments regarding remote access of the information is described in more detail below.

Thus, according to some embodiments, the controller may be or couple to a computer system operable to store and/or display information regarding the food storage bins.

Thus, as shown, the system may include a food storage bin, a receptacle for at least the food storage bin, a transmitter/receiver, and a controller. As indicated above, in some embodiments, the receptacle may be operable to receive/store a plurality of food storage bins such as the food storage bin 102 described above, each including a sensor that may receiver power from a transmitter/receiver, and transmit signals with information regarding the food storage bin to the transmitter/receiver. The transmitter/receiver, in turn, may transmit that information to the controller, which may store the received information. Thus, the respective sensors included in or coupled to the plurality of food storage bins, the transmitter/receiver, and the controller are operable to operate a plurality of times to measure temperature and/or other information over a plurality of time periods.

Further descriptions of methods associated with the systems described herein are presented below.

Figure 8:
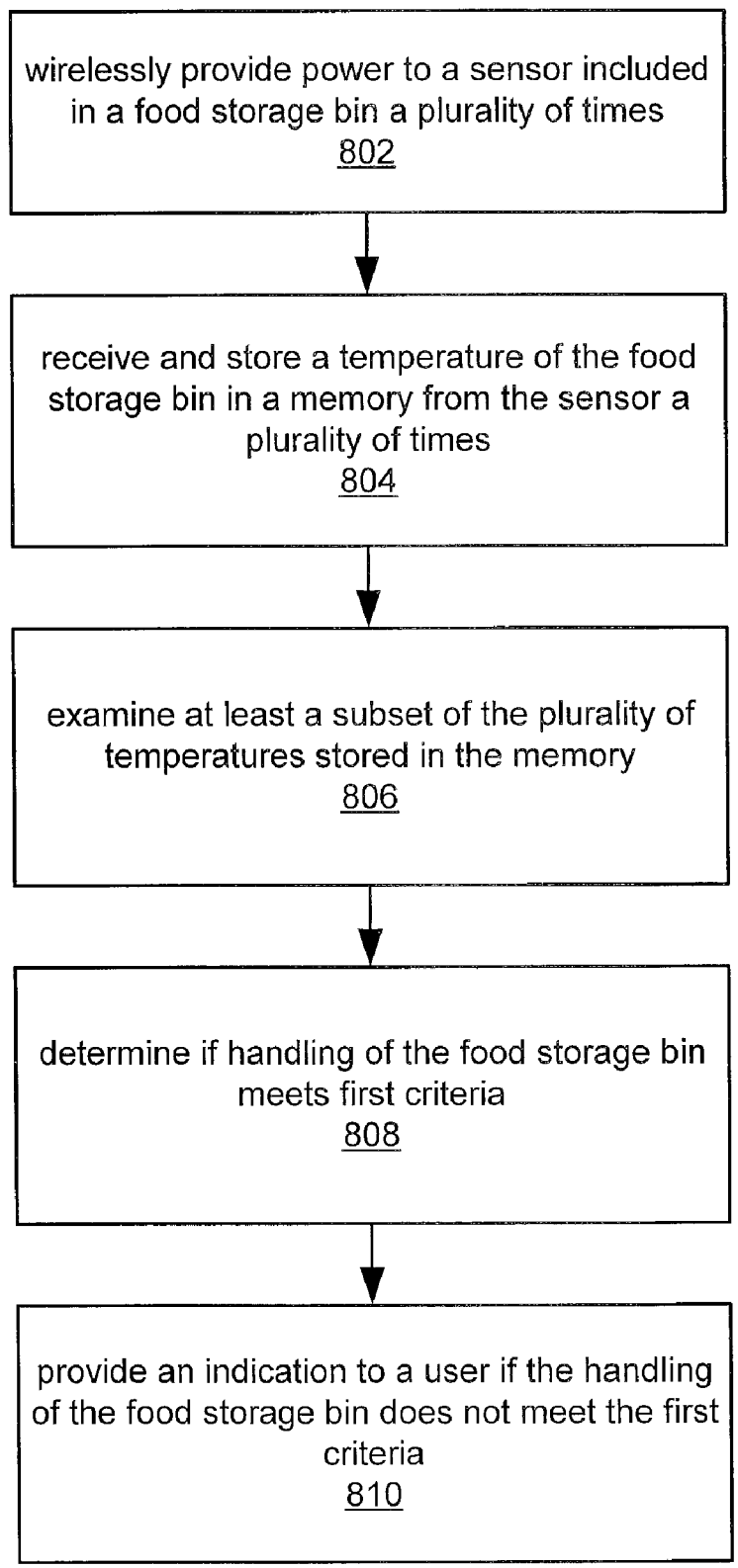
FIG. 8 is a flowchart diagram illustrating one embodiment for monitoring states of a food storage bin.

FIG. 8~M*ethod* for Monitoring States of a Food Storage Bin

FIG. 8 illustrates a method for monitoring states of one or more food storage bins, such as, for example, the food storage bin 102 described above. Note that the method shown in FIG. 8 may be used in conjunction with any of the systems or devices shown in the above Figures, among other systems. In various embodiments, some of the method elements shown may be performed concurrently, in a different order than shown, or may be omitted. Additional method elements may also be performed as desired. As shown, this method may operate as follows.

In 802, power may be wirelessly provided to a sensor included in a food storage bin a plurality of times. As described above, power may be provided to the sensor via a variety of methods. For instance, the controller may supply power via the transmitter/receiver using the coiled wires described above. The transmitter/receiver may be located in a food storage bin receptacle, in a food serving area, a food storage area, and/or a washing area. As indicated above, the coiled wires may be substantially parallel to the sensor, or coiled wires therein, such that an electric current is induced in the sensor, thereby providing power to the sensor. As indicated above, other methods for transmission and storage of power are envisioned and are not limited to the above descriptions.

In 804, information regarding temperature (among other information) of the food storage bin may be received from the sensor and stored in a memory a plurality of times. More specifically, upon each instance of receiving power from the transmitter receiver, the sensor may transmit, e.g., in a wireless manner, signals regarding the temperature of the food storage bin, among others, such as, for example, content, weight, pressure, and/or location of the food storage bin (among others), to the transmitter/receiver. As indicated above, the transmitter/receiver may receive this information from a variety of locations. In some embodiments, there may be a plurality of transmitter/receivers for each area (e.g., serving, storage, and/or cleaning areas, among others) which may receive the information from the sensor when the food storage bin enters the transmitter/receiver's particular area. Correspondingly, the signals may be sent to the controller or computer coupled thereto and stored in memory similar to descriptions above. In some embodiments, the controller may store information indicating which (or from what location the) transmitter/receiver sent the information. Thus, providing power to the sensor and wirelessly receiving and storing the resulting signals may operate to record a plurality of temperatures of the food storage bin in the memory, e.g., of the controller or the coupled computer system. In some embodiments, the log of temperatures may include other associated information, e.g., the type of food stored in the food storage bin associated with the respective temperature in the log. As indicated above, the controller may be operable to determine location of the food storage bin, e.g., via the signals received from the sensor; this information, among others, may also be stored in the log and associated with the temperatures. As also indicated above, the log of temperatures may be usable for numerous purposes, e.g., by the manger, storeowner, and/or health inspector, among others.

In 806, at least a subset of the plurality of temperatures stored in the memory may be examined, among other examinations such as those described herein as well as others. The plurality of temperatures may be automatically examined, i.e., by a software program. For example, in some embodiments, the examination may be performed by one or more of the controller, the coupled computer system, or a remote system. In some embodiments, the examination may include statistical analysis of the temperature logs, analysis of the content of the food storage bins and the content/location of the respective food storage bins, comparison of temperatures with thresholds, analysis of the weight and/or fullness of the content of the food storage bins, and/or other examinations. In some embodiments, the plurality of temperatures may be examined by a user.

In 808, a determination may be made as to whether the handling of the food storage bin meets first criteria, e.g., based on the examination of the subset of the plurality of temperatures. In some embodiments, the criteria may include at least one of criteria regarding temperature of food stored in the food storage bin, criteria regarding washing temperature of the food storage bin, or criteria regarding storage temperature of the food storage bin. Alternatively, or additionally, the first criteria may regard the temperature of the specific type of food stored in the food storage bin. Additionally, the first criteria may be based on regulations of the restaurant (or guidelines for that type of food service), regulations based on quality standards of various brands of the foods stored in the food storage bin, and/or other regulatory standards, e.g., according to the area of the restaurant/food service. Thus, as indicated above, a determination may be made as to whether the food stored in the food storage bin exceeded a "safe" temperature range.

The determination may regard whether or not the food storage bin reached a high enough temperature to kill bacteria or other organisms during washing/cleaning, e.g., where there are transmitter/receiver(s) near the washing areas possibly in addition to the serving areas/storage areas. In some embodiments, the determination may include whether or not the food storage bin was left in ambient temperatures for an extended period of time. For example, in many food establishments, vegetables or meat products are sliced in batches, e.g., for several food storage bins at a time; thus, in some embodiments, the determination may include determining whether the food storage bin was left out after the food was sliced instead of being placed in the freezer as should have been done. In one embodiment, the determination may include a temperature analysis of storage conditions, e.g., whether the cold storage is cold enough for the food kept in the food storage bin.

In some embodiments, the determination may also include an analysis of the food stored in the food storage bin over time, e.g., according to the information transmitted by the sensor in the food storage bin. For example, the determination may include a comparison of the weight and the time of the contents of the food storage bin over time. More specifically, if the content in the food storage bin has remained the same weight for the past few hours, the method may determine that the food has become stale. This determination may apply even if the temperature has been in the correct range. The determination may also include examining the amount of time the food storage bin has remained in storage without being emptied and/or washed. Thus, according to various embodiments, the determination may include any of various appropriate methods for determining if the handling of food meets first criteria. Note that the above determinations are exemplary only and that other determinations are envisioned.

In 810, an indication may be provided to a user if the handling of the food storage bin does not meet the first criteria. As indicated above, the determination may various analysis of the food storage bin, e.g., of the temperatures thereof, throughout the food preparation/storage/washing cycle. When one or more of these states are outside of determined parameters, e.g., the range of safe temperatures, storage temperature, washing temperature, etc., an indication or alert may be provided to the user, e.g., the storeowner, manager, and/or food safety inspector, among others. Similar to descriptions above, this indication may be presented to the user using one or more of numerous of methods. For example, the indication may take the form of an alert on a display screen, e.g., using a different color in, for example, a block representing the food storage bin, or an icon, among other methods. Alternatively, or additionally, the alert may be an audible one, e.g., to alert the manager of the food establishment or the employees that action needs to be taken with regard to the food storage bin, e.g., putting it in the freezer, changing the temperature, more adequately washing the food storage bin, etc. Thus, alerts may be let the user know if and how the food has been mishandled and what actions need to be taken to remedy the situation.

In some embodiments, the method may also include receiving a request for information regarding the plurality of temperatures, e.g., stored in the log, over a WAN, retrieving current information from the memory storing the log, e.g., included in the controller or coupled computer system, and providing the current information over the WAN, e.g., via a web server similar to descriptions herein, for analysis. The provided information may also be displayed on a display, e.g., as illustrated in FIG. 7, described above. Thus, according to some embodiments, the temperature logs and/or indications of handling/mishandling may be provided to various users and systems.

Thus, states of one or more food storage bins may be monitored over time, and data may be stored for examination and determination of food handling.

Figure 9:
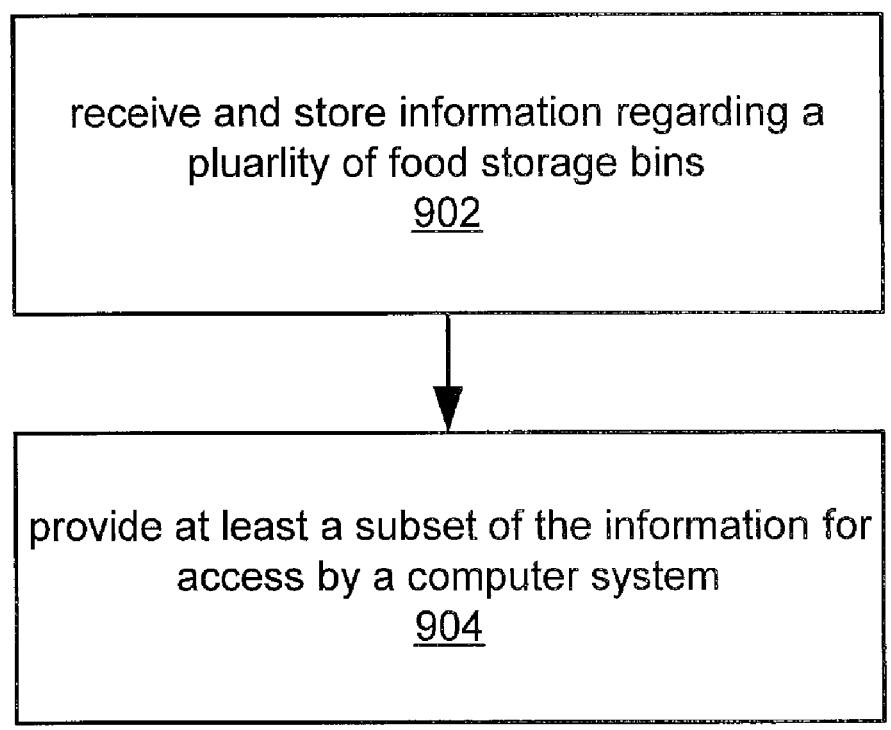
FIG. 9 is a flowchart diagram illustrating one embodiment of a method for providing remote access to information.

FIG. 9—Method for Providing Remote Access to the Information

FIG. 9 illustrates a method for providing remote access to the information, e.g., received and/or derived from the signals transmitted by the sensor(s). Note that the method shown in FIG. 9 may be used in conjunction with any of the systems or devices shown in the above Figures, among other systems. In various embodiments, some of the method elements shown may be performed concurrently, in a different order than shown, or may be omitted. Additional method elements may also be performed as desired. As shown, this method may operate as follows.

In 902, information regarding a plurality of food storage bins may be received and stored in a memory medium as described above. In some embodiments, the memory medium may be included in the controller or a computer system coupled to the controller. As indicated above, the information may include one or more of temperature, location, content, pressure, humidity, current state, and/or other information regarding the food storage bin.

In 904, at least a subset of the information may be provided for access by a computer system. More specifically, the controller and/or the coupled computer system may be accessible over a WAN, e.g., the Internet, by remote users or systems to retrieve information regarding the food storage bins. For example, in one embodiment, the controller and/or the coupled computer system may include a web server, e.g., program instructions executable to provide the web server, which may host a web page. In some embodiments, the web page may provide the display 700 or other GUI(s) to the user over the Internet. The subset of information may be accessed by the computer system, e.g., remotely. For example, a remote user may use a web browser program, e.g., MICROSOFT INTERNET EXPLORER™, FIREFOX™, or other web browsers, to access the web page. Alternatively, the remote computer system may include a program which retrieves and handles the information directly that is not a web browser. For example, the information may be stored in a log, database, text file, XML file, or other file, and the remote computer system may remotely access and display the information to the remote user. Thus, in some embodiments, the information retrieved from the sensors included in the plurality of food storage bins may be monitored from a variety of locations, e.g., from within the food establishment or remotely.

This access may be especially desirable for health and safety inspection services, e.g., as required by the public, state, and/or nation in which the food establishment is located, as well as for regional managers of restaurants, etc. More specifically, a health inspector or manager, instead of having to drive to the food establishment and inspecting each individual food bin as well as manual logs recorded over a period of weeks or months, may simply be able to review computer recorded logs retrieved from the controller or coupled computer system from an office. Even further, the health inspector/manager may simply query the recorded temperatures for any alerts or indications that the food was not handled correctly, e.g., the temperature of the food stored in the bin exceeded the predetermined range of temperatures for a prolonged (or determined) period of time.

In one embodiment, the health inspector's (or manager's) computer may execute a software program that automatically retrieves and analyzes temperature readings from various locations, and provides an indication when the temperature readings indicate non-compliance with regulations. The software program may further automatically provide a notice to the respective establishment notifying them of the non-compliance, or taking other action, as desired.

Thus, health and safety inspectors (and/or restaurant managers) may be able to monitor numerous locations throughout an entire region without having to use the inefficient and expensive inspection methods employed today.

Note that the remote programs and/or the web pages provided by the web server may take on any form, e.g., similar to descriptions above regarding the display 700. For example, in some embodiments, the remote user (health inspector, manager, etc.) may view a map of a city or location with food establishments highlighted or displayed in a different color, e.g., depending on adherence to health and safety regulations. Alternatively, icons may be displayed that are associated with each of the food establishments. For example, in one embodiment, similar to display 700, a regional manager may view each of, for example, his 16 restaurants as labeled icons on his computer screen. In some embodiments, the manager may be able to easily determine whether any one or more of the food establishments are adhering to the required health and safety regulations, as indicated above. More particularly, when a food establishment is no longer meeting regulations an alert, visual or otherwise, may be presented to the user. For example, an icon may appear next to the graphic representing the food establishment or a different color may be used. Alternatively, or additionally, an audible alert may be sounded for the user.

The remote user may be able to select (e.g., click on) the icon corresponding to a particular establishment location to obtain more information. For example, the user may choose to examine a particular food establishment in more detail. In one embodiment, the user may click on an icon which represents the food establishment, e.g., in a webpage hosted by the web server. Correspondingly, the web server, or other program, may display another GUI which displays information particular to that food establishment, e.g., similar to the display 700, among others. Additionally, or alternatively, the user may be able to interact with parameters of the food establishment or invoke sequences on the controller at the food establishment. For example, in one embodiment, the user may be able to specify how often the temperatures or other information is monitored, and/or change the food and safety regulations of the food establishment, e.g., on a per food type basis. Thus, according to some embodiments, the user may interact with the food establishment and/or the systems described herein using a webpage, e.g., via a browser, or other program from the computer. Note that the descriptions above may also apply for health inspector(s)/ inspections or other users/regulatory groups, and are not limited to allowing access to the information by managers. Additionally, the displays and programs described above are exemplary only, and other GUIs, displays, and programs are envisioned.

Thus, where one or more of the manager or the health inspectors can view such health and safety records of individual food establishments, general adherence to the regulations should improve, thus providing an overall health benefit to the public.

Figure 10:
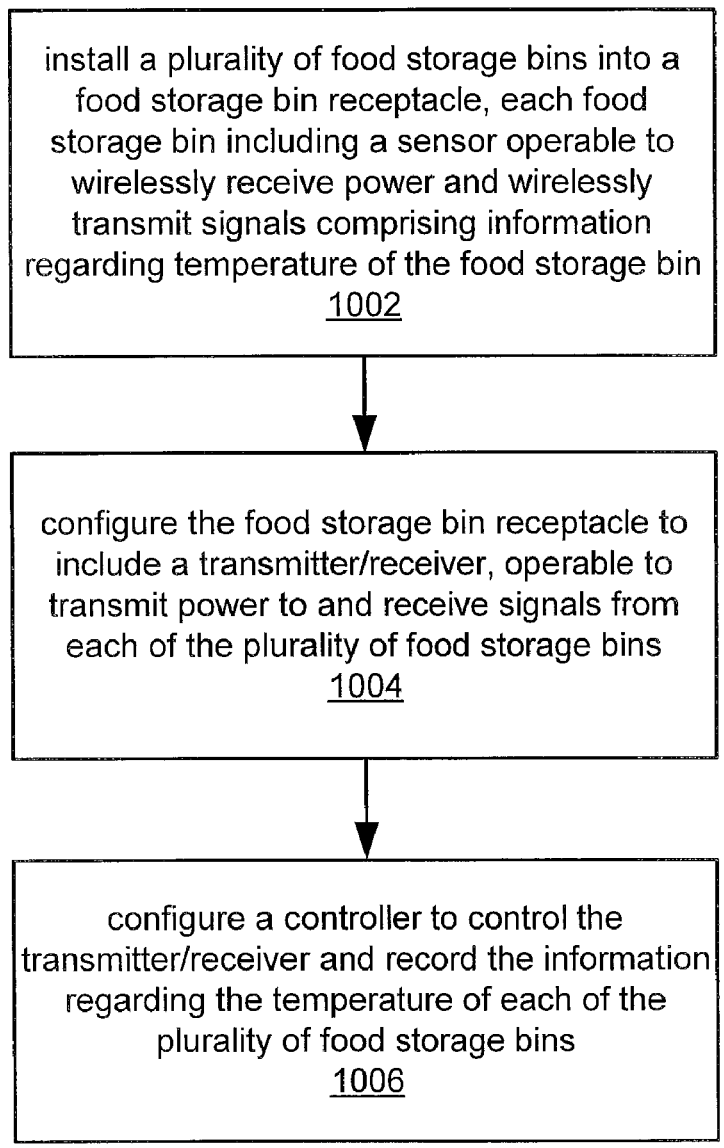
FIG. 10 is a flowchart diagram illustrating one embodiment of a method for configuring a food storage area.

FIG. 10—Method for Configuring a Food Storage Area

FIG. 10 illustrates a method for configuring a food storage area. Note that the method shown in FIG. 10 may be used in conjunction with any of the systems or devices shown in the above Figures, among other systems. In various embodiments, some of the method elements shown may be performed concurrently, in a different order than shown, or may be omitted. Additional method elements may also be performed as desired. As shown, this method may operate as follows.

In 1002, a plurality of food storage bins may be installed into a food storage bin receptacle. Similar to above descriptions, the food storage area and/or the receptacle may be washing areas, serving areas, storage areas (e.g., freezers, ovens, warming/cooling plates, and/or other storage areas), etc. In some embodiments, each food storage bin may include a sensor operable to wirelessly receive power and wirelessly transmit signals including information regarding temperature, location, weight, pressure, fullness, etc. of the food storage bin, similar to descriptions above.

In 1004, the food storage bin may be configured to include a transmitter/receiver, which may transmit power to and receive signals from each of the plurality of food storage bins, e.g., via respective sensors, similar to descriptions above.

In 1006, a controller may be configured to control the transmitter/receiver and record the information regarding the temperature of each of the plurality of food storage bins, as described above.

The method may also include monitoring the food storage bins, the states thereof, and/or the food stored therein, to ensure that the food provided, e.g., of the food establishment, is safe for consumption.

Thus, a food storage area may be configured to monitor temperatures, content, and/or location, among others, of a plurality of food storage bins, e.g., to ensure health and safety regulations are followed in the food establishment.

Figure 11:
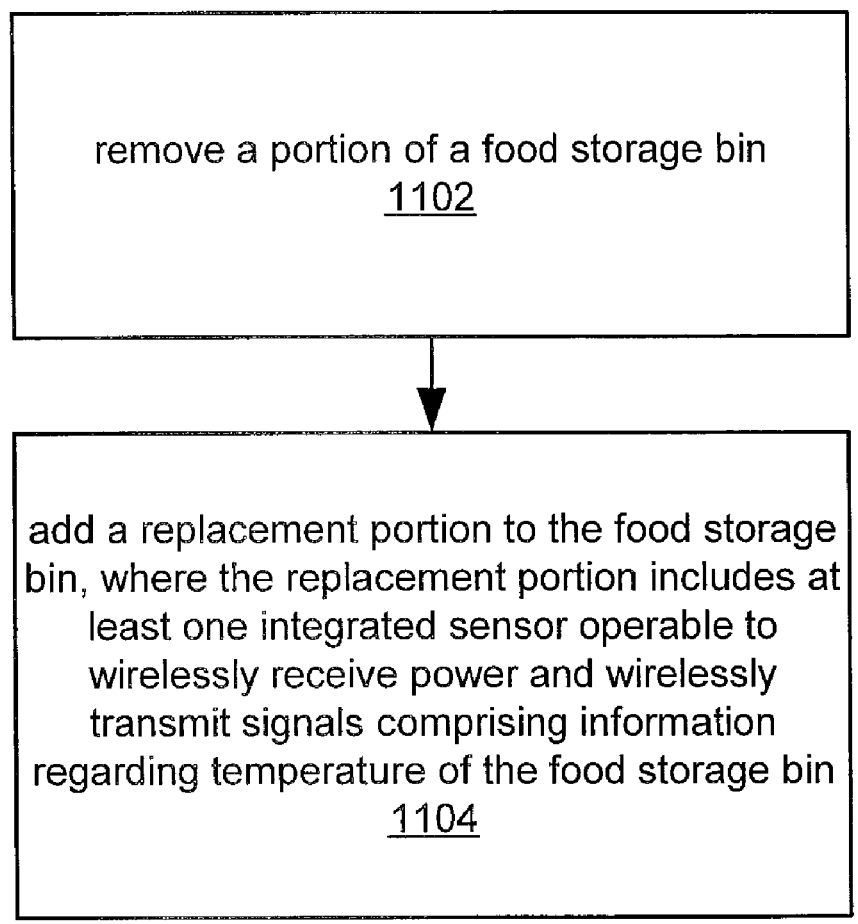
FIG. 11 is a flowchart diagram illustrating one embodiment of a method for retrofitting a food storage bin.

FIG. 11—Method for Retrofitting a Food Storage Bin

FIG. 11 illustrates a method for retrofitting a food storage bin. Note that the method shown in FIG. 11 may be used in conjunction with any of the systems or devices shown in the above Figures, among other systems. In various embodiments, some of the method elements shown may be performed concurrently, in a different order than shown, or may be omitted. Additional method elements may also be performed as desired. As shown, this method may operate as follows.

In 1102, a portion of a food storage bin may be removed. In some embodiments, the removed portion may be one or more of the bottom or the side portions of the food storage bin. The portion may be removed according to any of various methods; for example, in one embodiment, the portion may be removed so that it may be easily repaired or replaced as described below.

In 1104, a replacement portion may be added to the food storage bin. In some embodiments, the replacement portion may include at least one integrated sensor operable to wirelessly receive power and wirelessly transmit signals including information regarding temperature of the food storage bin. Additionally, in one embodiment, similar to descriptions above, the sensor may be hermetically sealed in the replacement portion such that it may not be damaged or harmed during various phases of the food preparation, storage, and/or cleaning cycle associated with the food storage bin. Additionally, or alternatively, the replacement portion may include thermally conductive material, thereby allowing the heating and/or cooling of the nearby environment, e.g., the heating/cooling receptacle, the freezer, and/or the washer, among others, to adequately affect the food storage bin and/or food stored therein.

Additionally, a food storage bin receptacle may be retrofitted to include a transmitter/receiver and a controller. In one embodiment, a transmitter/receiver may be added to the receptacle. Similar to descriptions above, the transmitter/receiver may be operable to wirelessly transmit power to and wirelessly receive signals from each of the plurality of food storage bins. As also described above, the information may regard temperature, content, weight, and/or location of the food storage bins, among other information.

A controller may then be coupled to the transmitter/receiver, operable to control the transmitter/receiver and record the information regarding the plurality of food storage bins in a memory. The foregoing descriptions of the transmitter/receiver, the controller, the sensors, and the receptacle may apply to the retrofitted food storage bin receptacle.

Thus, according to some embodiments, a food storage bin and/or a food storage bin receptacle may be retrofitted for the systems and methods described herein, e.g., for monitoring states and/or temperatures of the retrofitted food storage bin.

Thus, according to various embodiments, states of food storage bins may be monitored and stored to ensure that food is safely provided to customers.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A food storage system, comprising:
a food storage receptacle;
a plurality of food storage bins configured for placement in an opening of the food storage receptacle, wherein the bins are integral with the opening, wherein each food storage bin comprises:
a bottom portion;
one or more side portions;
wherein the bottom portion and the one or more side portions define a volume configured for storing food; and
at least one sensor usable to measure temperature within the volume, wherein the at least one sensor is configured to receive power and wirelessly transmit signals comprising information regarding the temperature;
a temperature regulator, configured to regulate the temperature of the food storage receptacle to a desired temperature range;
at least one transmitter/receiver configured to wirelessly transmit power to the at least one sensor of each of the plurality of food storage bins and wirelessly receive the respective signals comprising information regarding the temperature;
a controller coupled to the transmitter/receiver, wherein the controller is configured to:
receive the information regarding the temperature from the at least one sensor of each of the plurality of food storage bins via the transmitter/receiver; and
store the received temperature in a memory.

2. The system of claim 1, wherein the respective signals comprise information regarding contents of the food storage bin.

3. The system of claim 1, wherein the respective signals comprise information identifying a type of food stored in the food storage bin.

4. The system of claim 1, wherein the respective signals comprise information regarding weight of contents of the food storage bin.

5. The system of claim 1, wherein the respective signals comprise information regarding presence of chemical compounds or biological entities in the food storage bin.

6. The system of claim 1, wherein the controller is configured to determine the location of at least one of the food storage bins based on the signals received from the at least one sensor.

7. The system of claim 1, wherein the at least one sensor is hermetically sealed in the bottom and/or the one or more side portions of the food storage bin.

8. The system of claim 1, wherein the at least one sensor for each of the food storage bins, the at least one transmitter/receiver, and the controller are configured to operate a plurality of times to measure temperature over a plurality of time periods.

9. The system of claim 1, further comprising:
a computer system coupled to the controller, comprising a processor, the memory, and a display;
wherein the computer system is configured to display information related to the received temperature readings and/or the respective signals transmitted from the at least one sensor on the display.

10. The system of claim 1, further comprising:
a network interface coupled to the memory, wherein the network interface is configured to provide access to the information regarding the temperature over a wide area network.

11. The system of claim 1, wherein the system is comprised in a food establishment, and wherein the memory stores information identifying the food establishment.

12. The system of claim 1, further comprising:
a web server comprised in or coupled to the controller, which is configured to provide access to the information regarding the temperature over a wide area network.

13. The system of claim 1, wherein each food storage bin further comprises a coiled wire electrically coupled to the sensor, wherein the sensor is configured to receive power via the coiled wire.

14. The system of claim 1, wherein each food storage bin comprises a member which extends or projects into the volume, wherein the member comprises material configured to thermally conduct the temperature inside the volume.

15. The system of claim 1, wherein each food storage bin is configured to store a respective type of food.

16. The system of claim 1, wherein at least a portion of the at least one bin comprises thermally conductive material.

17. A method for monitoring states of a plurality of food storage bins, comprising:
wirelessly providing power to a sensor comprised in each food storage bin, wherein the plurality of food storage bins are comprised in an opening of a food storage receptacle, wherein the bins are integral with the opening, and wherein the food storage receptacle is configured to regulate the temperature of the plurality of food storage bins;
receiving and storing a temperature from the sensor of each of the food storage bins in a memory, wherein the temperature is wirelessly received from the sensor;

wherein said wirelessly providing power and said receiving and storing a temperature are performed a plurality of times to receive and store a plurality of temperatures for the plurality of food storage bins;

examining at least a subset of the plurality of temperatures stored in the memory;

determining if handling of each of the food storage bins meets first criteria based on said examining;

providing an indication to a user if the handling of at least one of the food storage bins does not meet the first criteria.

18. The method of claim 17, wherein the first criteria comprises at least one of:

criteria regarding temperature of food stored in the food storage bin;

criteria regarding washing temperature of the food storage bin; or criteria regarding storage temperature of the food storage bin.

19. The method of claim 17, wherein the criteria regarding the temperature of the food stored in the food storage bin is specific to a type of the food stored in the food storage bin.

20. The method of claim 17, further comprising:

receiving a request for information regarding the plurality of temperatures over a wide area network;

retrieving current information from the memory; and providing the current information over the wide area network for analysis.

21. The method of claim 20, wherein said providing comprises a web server coupled to the memory providing the current information over the wide area network.

22. The method of claim 17, further comprising:

accessing the memory over a wide area network;

retrieving current information from the memory; and displaying the current information on a display, wherein said displaying the current information comprises said providing.

23. The method of claim 17, further comprising:

receiving and storing, from the sensor of each of the plurality of food storage bins, and in the memory, one or more of:

weight of contents of the food storage bin;

location of the food storage bin;

type of food in the food storage bin;

presence of one or more specific chemical compounds; or presence of one or more specific biological organisms;

wherein the temperature is wirelessly received from the sensor;

wherein said wirelessly providing power and said receiving and storing a temperature and said receiving and storing, from the sensor of each of the plurality of food storage bins, are performed a plurality of times to receive and store information regarding the food storage bin; and wherein said examining at least a subset of the plurality of temperatures stored in the memory comprises examining the information.

24. A method for configuring a food storage system to perform food monitoring, comprising:

placing a plurality of food storage bins in an opening of a food storage bin receptacle, wherein the bins are integral with the opening, each food storage bin comprising a sensor configured to wirelessly receive power and wirelessly transmit signals comprising information regarding temperature of the food storage bin;

configuring the food storage bin receptacle to include at least one transmitter/receiver, configured to transmit power to each of the plurality of food storage bins and receive signals from each of the plurality of food storage bins;

configuring a controller to control the transmitter/receiver and record the information regarding the temperature of each of the plurality of food storage bins;

wherein the food storage system is configured to monitor food stored in the plurality of bins in order to ensure that the food is safe for consumption.

25. A method for retrofitting a food storage bin receptacle to include a transmitter/receiver, the method comprising:

adding a transmitter/receiver to the food storage bin receptacle, wherein the transmitter/receiver is configured to wirelessly transmit power to and wirelessly receive signals from each of a plurality of food storage bins, wherein the signals comprise information regarding temperature of the plurality of food storage bins, and wherein the plurality of food storage bins are insertable into an opening of the food storage bin receptacle such that the food storage bins are integral with the opening; and coupling the transmitter/receiver to a controller, wherein the controller is configured to control the transmitter/receiver and record the information regarding the temperature of the plurality of food storage bins in a memory;

wherein the food storage bin receptacle is usable in a food monitoring system to maintain a log of temperature information of food stored in the new food storage bin.

* * * * *